US007009554B1

(12) United States Patent
Mookerjee et al.

(10) Patent No.: US 7,009,554 B1
(45) Date of Patent: Mar. 7, 2006

(54) REDUCED STATE ESTIMATION WITH MULTISENSOR FUSION AND OUT-OF-SEQUENCE MEASUREMENTS

(75) Inventors: Purusottam Mookerjee, Bridgewater, NJ (US); Frank J. Reifler, Cinnaminson, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/093,228

(22) Filed: Mar. 30, 2005

(51) Int. Cl.
    *G01S 13/66* (2006.01)
(52) U.S. Cl. .................................. 342/195; 342/90
(58) Field of Classification Search ............... 342/90, 342/192, 195
    See application file for complete search history.

(56) References Cited

U.S. PATENT DOCUMENTS

| 4,179,696 A * | 12/1979 | Quesinberry et al. ....... 342/195 |
| 2005/0128138 A1 * | 6/2005 | McCabe et al. ............ 342/195 |
| 2005/0179580 A1 * | 8/2005 | Cong et al. ................... 342/90 |

OTHER PUBLICATIONS

Seabald et al., "Robust State Estimation in Uncertain Systems: Combined Detection-Estimation with incremental MSE Criterion", IEEE Transactions on Automatic Contril, vol. 22, Issue 5, Oct. 1977, PP. 821-825.*

* cited by examiner

*Primary Examiner*—Ian J. Lobo
(74) *Attorney, Agent, or Firm*—Duane Morris LLP (57) ABSTRACT

This invention relates to state estimation after processing measurements with time delays from multiple sensors of systems characterized by state variables and by multidimensional parameters, for which the latter are unknown and may vary arbitrarily in time within known physical bounds. If a measurement is time-late, apply the measurement to an out-of-sequence filter that uses a mean square optimization criterion that accounts for measurement errors and said bounding values, as well as the delay time, to optimally produce estimates of the true states of the system. If the measurement is not time-late, apply the measurements to an in-sequence filter that uses a mean square optimization criterion that accounts for measurement errors and said bounding values, to produce estimates of the true states of the system. The estimates are applied to one of (a) making a decision relating to the system, (b) operating a control system, and (c) controlling a process.

2 Claims, 3 Drawing Sheets

REDUCED STATE ESTIMATION WITH MULTISENSOR FUSION AND OUT-OF-SEQUENCE MEASUREMENTS

FIELD OF THE INVENTION

This invention relates generally to state estimation after processing measurements with time delays from multiple sensors of systems characterized by state variables and by multidimensional parameters, for which the latter are unknown and may vary arbitrarily in time within known physical bounds. In a particular aspect, the invention relates to the tracking of moving targets using estimation, which takes into consideration delays in reporting measurements from multiple sources, measurement errors, and physical bounds or limits on parameters of the target track.

BACKGROUND OF THE INVENTION

Figure 1:
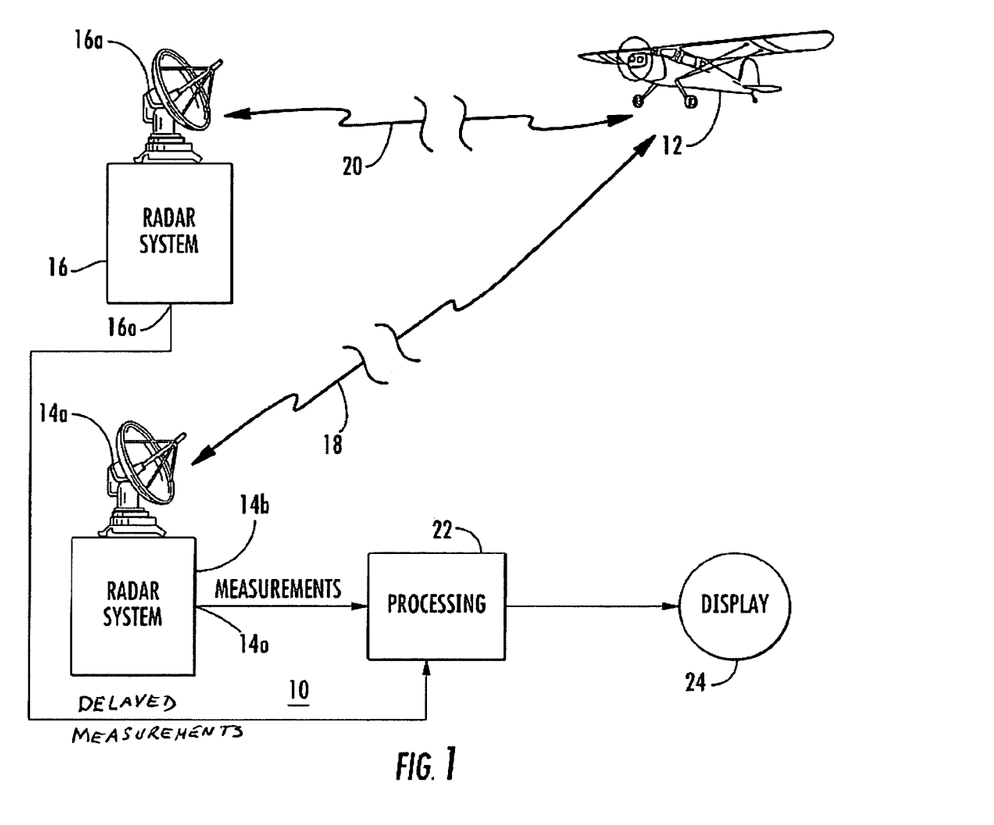
FIG. 1 is a simplified block diagram of a system for estimating the state of a target, which in this case is the track of an aircraft, after processing measurements with time delays from multiple sensors of systems.

FIG. 1 represents a simplified target tracking system 10. System 10 tracks a target, illustrated as being an aircraft 12, by the use of multiple radar systems 14, 16. Radar system 14 includes a radar antenna 14a, which transmits and receives radar signals illustrated by "lightning bolt" symbols 18. Portions of the transmitted signals 18 are reflected by target 12 and return to the radar antenna 14a. The returned signals allow the generation of measurements at an output port 14o of radar system 14. Radar system 16 includes a radar antenna 16a, which transmits and receives radar signals illustrated by "lightning bolt" symbols 20. Portions of the transmitted signals 20 are reflected by target 12 and return to the radar antenna 16a. The returned signals allow the generation of measurements at an output port 16o of radar system 16. These measurements include values of at least target position, possibly in the form of range and angles from the radar systems 14 and 16. A possible scenario is that radar system 14 has less accuracy (higher measurement noise) but provides more current data whereas radar system 16 is more accurate (less measurement noise) but provides data with time latency. The measurements are applied to a processing arrangement 22, which determines from the measurements various target parameters, which may include course (direction of motion), speed, and target type. The estimated position of the target, and possibly other information, is provided to a utilization apparatus or user, illustrated in this case as being a radar display 24. The operator (or possibly automated decision-making equipment) can make decisions as to actions to be taken in response to the displayed information. It should be understood that the radar tracking system 10 of FIG. 1 is only one embodiment of a general class of estimation systems for systems with distributed sensors such as nuclear, chemical, or manufacturing factories or facilities, control processes subject to external parameter changes, space station subject to vibrations, automobile subject to weather conditions, and the like.

State-of-the-art tracking systems utilize measurements fed to a processing site from multiple sensors. These sensors may have different measuring accuracies and may be geographically dispersed over a region of interest. Availability of reliable high bandwidth communication media allows such a topology of distributed multiple sensors for real-time processing of the measurements.

In spite of today's high bandwidth and fast switching communication network, physical distances, path diversity and relays may result in different delays from various sensors to the processing site. Let a sensor $S_1$ measure a tracked object at time $t_1$ and a sensor $S_2$ measure that same object at time $t_2$ where $t_2 > t_1$. It is possible that the measurement from sensor $S_1$ may arrive many sampling intervals after the measurement from sensor $S_2$ has already been processed. A simple decision methodology is to throw out the late-arriving measurement from sensor $S_1$, and not process it at all. However, if sensor $S_1$ is the more accurate sensor, this methodology does not make good use of that sensor.

A difficulty is that accounting for measurements received out of sequence, as frequently happens in situations of multiple sensor tracking with variable communication delays between sensors, greatly complicates the design of a Kalman filter, particularly when more than one subsequent measurement is processed before an out-of-sequence measurement is received as indicated in Y. Bar-Shalom, "Update with Out-of-Sequence Measurements in Tracking: Exact Solution," *IEEE Transactions on Aerospace and Electronic Systems*, pp. 769–778, Vol. AES-38, No. 3, July 2002, J. R. Moore and W. D. Blair, "Practical Aspects of Multisensor Tracking," in *Multitarget-Multisensor Tracking: Applications and Advances*, Volume III, Y. Bar-Shalom and William Dale Blair, (ed.), Boston, Mass.: Artech House, 2000, pp. 43–44, and Portmann, Moore, and Bath. Currently, even with rapid communications, delays of up to one second are not uncommon. As described below, even such small delays may have a significant effect on multisensor fusion tracking performance. Unlike smoothing and filtering, "how to update the current state estimate with an "older" measurement is a nonstandard estimation problem" as quoted from Y. Bar-Shalom, M. Mallick, H. Chen, and R. Washburn, "One-Step Solution for the General Out-of-Sequence-Measurement Problem in Tracking," *Proceedings of 2002 IEEE Aerospace Conference Proceedings*, Volume 4, pp. 1551–1559, March 2002. No one definitive approach has yet been developed for this. The above is the opinion of Y. Bar-Shalom; Y. Bar-Shalom, M. Mallick, H. Chen, and R. Washburn; S. Challa and J. A. Legg, "Track-to-Track Fusion of Out-of-Sequence Tracks," *Proceedings of the Fifth International Conference on Information Fusion*, pp. 919–926, July 2002; S. Challa, R. J. Evans, X. Wang, and J. Legg, "A Fixed-Lag Smoothing Solution to Out-of-Sequence Information Fusion Problems," *Communications in Information and Systems*, pp. 325–348, Vol. 2, No. 4, December 2002; M. L. Hernandez, A. D. Marrs, S. Maskell, and M. R. Orton, "Tracking and fusion for wireless sensor networks," *Proceedings of the Fifth International Conference on Information Fusion*, Vol. 2, pp. 1023–1029, July 2002; M. Ito, S. Tsujimichi, and Y. Kosuge, "Target Tracking with Time-Delayed Data in Multiple Radar System," *Proceedings of the 37th SICE Annual Conference*, pp. 939–944, July 1998; J. R. Moore and W. D. Blair; M. Mallick, S. Coraluppi, and C. Carthel, "Advances in Asynchronous and Decentralized Estimation," *Proceedings of 2001 IEEE Aerospace Conference Proceedings*, Vol. 4, pp. 1873–1888, March 2001; M. Mallick, J. Krant, and Y. Bar-Shalom, "Multi-sensor Multitarget Tracking using Out-of-sequence Measurements," *Proceedings of the Fifth International Conference on Information Fusion*, Vol. 1, pp. 135–142, July 2002. This is particularly true when it is desired that during target maneuvers, the state estimate at the time of the current update (as opposed to at the past time of the "older" measurement, as in smoothing) have minimal covariance.

Filters without plant noise can optimally process out-of-sequence measurements in the order that they are received as stated by G. J. Portmann, J. R. Moore, and W. G. Bath supra. An optimal reduced state estimator has been developed that approximates the higher derivatives of target motion with constant parameters belonging to a multivariate Gaussian distribution as in the patent application entitled "REDUCED STATE ESTIMATOR FOR SYSTEMS WITH PHYSICALLY BOUNDED PARAMETERS," filed Mar. 16, 2005, in the names of P. Mookerjee and F. Reifler. This estimator does not need the white plant noise required by Kalman filter to cope with the reduced state. Among all estimators (including reduced state Kalman filters) with the same reduced states, the optimal reduced state estimator has minimal covariance. This covariance is the minimal covariance achievable by linearly weighting the predicted states with a new measurement at each successive update of the filter. Since parameter uncertainty is included in the total error covariance that is minimized, the optimal reduced state estimator does not need white plant noise to cope with the reduced state.

Algorithms in the prior art are based on the Kalman filter. These algorithms either set the white process noise to zero while processing an out-of-sequence measurement (which does not achieve good performance), or using a non-zero white process noise, provide solutions for processing measurements which are late by at most a few update intervals. No algorithm exists in the prior art for providing an optimal solution when delays occur that are longer than a few update intervals. It is common, however, that delays may be large such as ten or more update intervals, which the current algorithms do not address.

In the prior art, the solutions are approximate as stated in P. J. Lanzkron and Y. Bar-Shalom, "A Two-Step Method for Out-Of-Sequence Measurements," Proceedings of the IEEE Aerospace Conference, Big Sky, Mont., March 2004, pp. 2036–2041. These approximations are not available for delays larger than a few update intervals.

Improved or alternative estimators are desired for coping with out-of-sequence measurements that are late by a number of update intervals.

SUMMARY OF THE INVENTION

In general, the invention relates to state estimation derived from measurements from multiple sensors with time delays. The invention is particularly applicable to state estimation when some measurements arrive late by large number of update intervals, which may be as much as ten, or even more intervals late.

A method according to an aspect of the invention is for recursively estimating the state of a system having multidimensional parameters in addition to state variables, which parameters are unknown, arbitrarily time-varying, except for known bounded values. For example, the turn rate and tangential acceleration of an aircraft are multidimensional arbitrarily time-varying parameters that have known bounds, in addition to the state of the aircraft given by its position and velocity. Said state estimates are derived from measurements subject to time delays and measurement errors. The state estimates are used to make decisions or to operate a control system or to control a process.

A method according to another aspect of the invention is for estimating the state of a system comprising the steps of observing a system having state variables and also having unknown, multidimensional, arbitrarily time-varying parameters, but which are subject to known bounded values and driven by a time-varying input function that depends on the states, and multidimensional parameters, measuring certain aspects of the state of the system in the presence of measurement errors to produce initial measurements, initializing state estimates and matrices using a priori information and the initial measurements. Then, the update interval is used in determining the system transition matrices and the mean value of unknown but bounded parameters and the input vector.

A method according to another aspect of the invention is determining if the measurement is time-late by testing the sign of the update interval. If the measurement is time-late, apply the measurement to an out-of-sequence estimating filter that explicitly uses a mean square optimization criterion that separately accounts for measurement errors and said bounding values, as well as the delay time, to produce estimates of the true state of the system. If the measurement is not time-late, apply the measurement to an in-sequence estimating filter that explicitly uses a mean square optimization criterion that separately accounts for measurement errors and said bounding values, to produce estimates of the true state of the system. The said estimates are applied to one of (a) make a decision relating to said system, (b) operate a control system, and (c) control a process.

An aspect of the invention relates to estimating the state of a system having multidimensional parameters $\lambda$ in addition to state variables $x(k)$ at time $t_k$ for $k=1,2,3,\ldots$, which parameters $\lambda$ are unknown, arbitrarily time-varying, but bounded, and driven by the nonlinear input function $u(x(k),\lambda)$ and governed by the state equation $$x(k+1)=\Phi x(k)+\Gamma u(x(k),\lambda) \qquad (1)$$

where $\Phi,\Gamma$ are system matrices dependent on the discrete time interval $T=t_{k+1}-t_k$.

Another aspect of the invention relates to measuring aspects of the state of the system governed by the measurement equation $$z(k)=Hx(k)+n(k) \qquad (2)$$

where $n(k)$ is the measurement noise with covariance N and measurement matrix H at time $t_k$ for $k=1,2,3,\ldots$.

The method comprises the steps of:

(a) Measuring aspects of the state of the system to produce initial measurements;

(b) Initializing a filter with an initial state estimate $\hat{x}(k_0|k_0)$ and matrices $M(k_0|k_0), D(k_0|k_0)$ associated with the initial state covariance and using a priori information and the initial measurements. In general, a vector $\hat{x}(t|k)$ is defined as the estimate of the state of the system at time t after processing k measurements $z(i)$ for $1 \leq i \leq k$. The vector $\hat{x}(t_j|k)$ is denoted as $\hat{x}(j|k)$ when the time $t=t_j$ is the time of the $j^{th}$ measurement for $j=1,2,3,\ldots$. A matrix $M(t|k)$ is defined as the covariance of the state estimation errors at time t due only to the errors in the measurements $z(i)$ for $1 \leq i \leq k$ and a priori initial information that is independent of the parameter uncertainty. The matrix $M(t_j|k)$ is denoted as $M(j|k)$, when the time $t=t_j$ is the time of the $j^{th}$ measurement for $j=1,2,3,\ldots$. A matrix $D(t|k)$ is defined as the matrix of bias coefficients, which linearly relates state estimation errors to the parameter errors, at time t (after processing $k=0,1,2,\ldots$ measurements). The matrix $D(t_j|k)$ is denoted as $D(j|k)$, when the time $t=t_j$ is the time of the $j^{th}$ measurement for $j=1,2,3,\ldots$. The use of the matrices $M(j|k)$, and $D(j|k)$ instead of $S(j|k)$ is a difference of the current invention from the prior art.

(c) Determining the time $t_{k+1}$ of a new measurement and the time t when the filter was last updated. Using the update interval $T=t_{k+1}-t$, determine the system transition matrices $\Phi$ and $\Gamma$. Note that for the update interval $T=t_{k+1}-t$, the time t denotes the time when the filter was last updated, whereas $t_{k+1}$ is the time of the new measurement, which can be prior to t due to delay. For this case T≧0. If there is no delay, then usually t=$t_k$, the time of the previous measurement. For this case T≧0. Also determine the mean value $\bar{\lambda}$ of unknown but bounded parameters $\lambda$, and the input vector $u(\hat{x}(t|k),\bar{\lambda})$.

(d) Measuring aspects z(k) of the state of the system where n(k) is the measurement noise with covariance N and measurement matrix H at time $t_k$ for k=1,2,3, . . . ;

(e) Determining whether the measurement is time-late by testing if T<0. If T<0 then
1. Determining F,G as follows $$F = \Phi + \Gamma \frac{\partial u}{\partial x}\bigg|_{x=\hat{x}(t|k), \lambda=\bar{\lambda}} \quad (3)$$

$$G = \Gamma \frac{\partial u}{\partial \lambda}\bigg|_{x=\hat{x}(t|k), \lambda=\bar{\lambda}} \quad (4)$$

2. Generating a parameter matrix Λ representing physical bounds on those parameters that are not state variables of the system. This is a departure from the prior art, which uses a white process noise covariance, W, that does not easily lend itself to processing out-of-sequence measurements arriving later than an update interval.

3. Extrapolate the state estimates $\hat{x}(t|k)$ and matrices M(t|k), D(t|k), to $\hat{x}(k+1|k)$, M(k+1|k), D(k+1|k), $$\hat{\imath}\hat{t}\hat{a}\hat{l}\hat{x}\hat{m}\hat{e}\hat{d}(k+1|k)=\Phi\hat{\imath}\hat{t}\hat{a}\hat{l}\hat{x}\hat{m}\hat{e}\hat{d}(t|k)+\Gamma u(\hat{\imath}\hat{t}\hat{a}\hat{l}\hat{x}\hat{m}\hat{e}\hat{d}(t|k),\bar{\lambda}) \quad (5)$$

$$M(k+1|k)=FM(t|k)F' \quad (6)$$

$$D(k+1|k)=FD(t|k)+G \quad (7)$$

and calculating S(k+1|k) as follows $$S(k+1|k)=M(k+1|k)+D(k+1|k)\Lambda D(k+1|k) \quad (8)$$

4. Determine covariance of the residual Q as follows $$Q=HS(k+1|k)H'+N \quad (9)$$

5. Determine the filter gain matrix K as follows $$K=[M(t|k)F'+D(t|k)\Lambda D(k+1|k)']H'Q^{-1} \quad (10)$$

6. Determine the matrix L as follows $$L=I-KHF \quad (11)$$

where I is the identity matrix;

7. Update the state estimate $\hat{x}(k+1|k)$ as $$\hat{x}(t|k+1)=\hat{x}(t|k)+K[z(k+1)-H\hat{x}(k+1|k)] \quad (12)$$

8. and the matrices M(k+1|k) and D(k+1|k) as $$M(t|k+1)=LM(t|k)L'+KNK' \quad (13)$$

$$D(t|k+1)=D(t|k)-KHD(k+1|k) \quad (14)$$

and

9. Generating the total mean square error S(t|k+1) as follows $$S(t|k+1)=M(t|k+1)+D(t|k+1)\Lambda D(t|k+1)' \quad (15)$$

(f) Determining whether the measurement is time-late by testing if T<0. If T≧0 then
1. Determine F,G using $$F = \Phi + \Gamma \frac{\partial u}{\partial x}\bigg|_{x=\hat{x}(k|k), \lambda=\bar{\lambda}} \quad (16)$$

$$G = \Gamma \frac{\partial u}{\partial \lambda}\bigg|_{x=\hat{x}(k|k), \lambda=\bar{\lambda}} \quad (17)$$

2. Generate a parameter matrix Λ, representing physical bounds on those parameters that are not state variables of the system;

3. Extrapolate said state estimates $\hat{x}(k|k)$ and matrices M(k|k), D(k|k), S(k|k) to $\hat{x}(k+1|k)$, M(k+1|k), D(k+1|k), and S(k+1|k) as follows $$\hat{x}(k+1|k)=\Phi\hat{x}(k|k)+\Gamma u(\hat{x}(k|k),\bar{\lambda}) \quad (18)$$

$$M(k+1|k)=FM(k|k)F' \quad (19)$$

$$D(k+1|k)=FD(k|k)+G \quad (20)$$

$$S(k+1|k)=M(k+1|k)+D(k+1|k)\Lambda D(k+1|k)' \quad (21)$$

4. Determine covariance of the residual Q as follows $$Q=HS(k+1|k)H'+N \quad (22)$$

5. Determine the filter-gain matrix K as follows $$K=S(k+1|k)H'Q^{-1} \quad (23)$$

6. Determine the matrix L as follows $$L=I-KH \quad (24)$$

where I is the identity matrix;

7. Update the state estimate $\hat{x}(k+1|k)$ as follows $$\hat{x}(k+1|k+1)=\hat{x}(k+1|k)+K[z(k+1)-H\hat{x}(k+1|k)] \quad (25)$$

8. Update the matrices M(k+1|k) and D(k+1|k) as $$M(k+1|k+1)=LM(k+1|k)L'+KNK' \quad (26)$$

$$D(k+1|k+1)=LD(k+1|k) \quad (27)$$

and

9. Generate the total mean square error S(k+1|k+1) as follows $$S(k+1|k+1)=M(k+1|k+1)+D(k+1|k+1)\Lambda D(k+1|k+1)' \quad (28)$$

DESCRIPTION OF THE INVENTION

Figure 2:
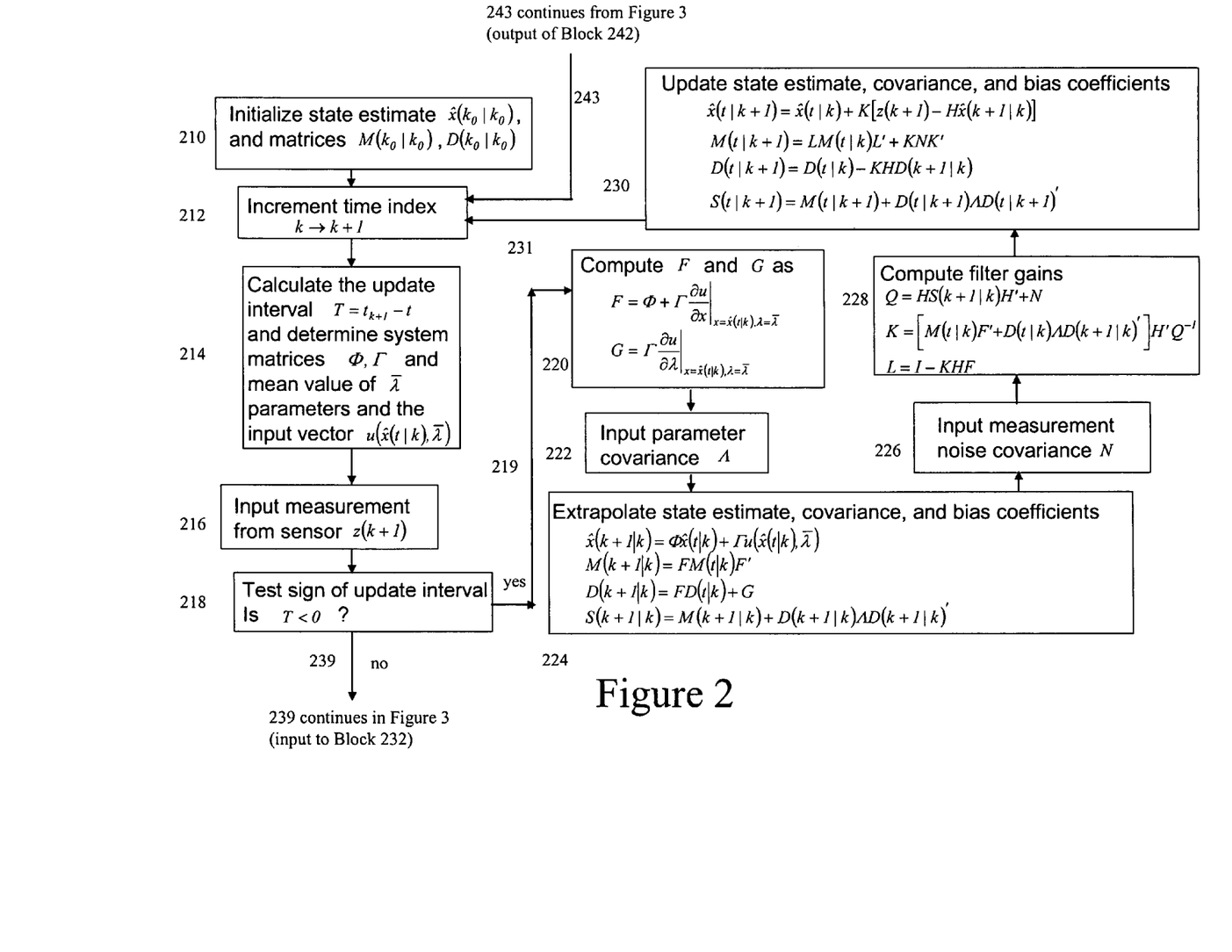
FIGS. 2 and 3 together constitute a simplified logic flow chart or diagram illustrating the recursive processing associated with a reduced-state estimator according to an aspect of the invention, which may be used in the arrangement of FIG. 1.

The solution of the problem of state estimation after processing measurements with time delays from multiple sensors of systems characterized by state variables and by multidimensional parameters, for which the latter are unknown and may vary arbitrarily in time within known physical bounds requires a completely different method, which is incorporated in an aspect of the invention. The simplified logic flow chart or diagram 200 of FIG. 2 illustrates a method according to an aspect of the invention. In FIG. 2, the logic flow of the invention begins in a block 210 with initialization of the state estimate $\hat{x}(k_0|k_0)$ and the matrices $M(k_0|k_0)$, $D(k_0|k_0)$. In general, a vector $\hat{x}(t|k)$ is defined as the estimate of the state of the system at time t after processing k measurements z(i) for $1 \leq i \leq k$. The vector $\hat{x}(t_j|k)$ is denoted as $\hat{x}(j|k)$ when the time $t=t_j$ is the time of the $j^{th}$ measurement for j=1,2,3, . . . . A matrix M(t|k) is defined as the covariance of the state estimation errors at time t due only to the errors in the measurements z(i) for $1 \leq i \leq k$ and a priori initial information that is independent of the parameter uncertainty. The matrix $M(t_j|k)$ is denoted as M(j|k), when the time $t=t_j$ is the time of the $j^{th}$ measurement for j=1,2,3, . . . . A matrix D(t|k) is defined as the matrix of bias coefficients, which linearly relates state estimation errors to the parameter errors, at time t (after processing k=0,1,2, . . . measurements). The matrix $D(t_j|k)$ is denoted as D(j|k), when the time $t=t_j$ is the time of the $j^{th}$ measurement for j=1,2,3, . . . . The use of the matrices M(j|k), and D(j|k) instead of S(j|k) is a difference of the current invention from the prior art. From block 210, the logic of the invention of FIG. 2 flows to a block 212, which represents the incrementing of a time index k to k+1.

The logic of the invention then flows to a further block 214, which represents calculating the update interval according to $$T = t_{k+1} - t \tag{29}$$

and determining the system transition matrices $\Phi, \Gamma$, and the mean value $\overline{\lambda}$ of unknown but bounded parameters $\lambda$ and also the input vector $u(\hat{x}(t|k), \overline{\lambda})$. Note that for the update interval $T=t_{k+1}-t$, the time t denotes the time when the filter was last updated, whereas $t_{k+1}$ is the time of the new measurement, which can be prior to t due to delay. For this case T<0. If there is no delay, then usually $t=t_k$, the time of the previous measurement. For this case $T \geq 0$.

From block 214 of FIG. 2, the logic flows to a block 216, which represents the measurement z(k+1) of aspects of the state of the system. This step is same as the corresponding step of the prior art.

In decision block 218 the latency of the measurement is determined by testing the sign of the update interval, i.e., T<0.

If T<0, the logic of the invention then flows from decision block 218 by way of the YES output and a path 219 to a block 220, in which the matrices F and G are calculated according to $$F = \Phi + \Gamma \frac{\partial u}{\partial x}\bigg|_{x=\hat{x}(t|k), \lambda=\overline{\lambda}} \tag{30}$$

$$G = \Gamma \frac{\partial u}{\partial \lambda}\bigg|_{x=\hat{x}(t|k), \lambda=\overline{\lambda}} \tag{31}$$

From block 220, the logic of the invention of FIG. 2 flows to a block 222, which accesses or inputs a parameter matrix $\Lambda$. The parameter matrix $\Lambda$ represents the physical bounds on the unknown parameters, such as turn rate and tangential acceleration, and is preferably selected based on a precise description of the physical system, and depends upon well-known physical phenomena and characteristics of real systems. Types of physical parameters, which might be considered for determination of $\Lambda$ in the case of maneuvers, are the turn rate $\omega$ and the tangential acceleration $\alpha$. This is a departure from the prior art, which uses a white process noise covariance W that does not correctly model the class of systems addressed by the invention herein.

From block 222 of FIG. 2, the logic flow of the invention proceeds to a block 224, which represents the extrapolation of state estimates $\hat{x}(t|k)$ and matrices M(t|k), D(t|k), according to $$\hat{x}(k+1|k) = \Phi \hat{x}(t|k) + \Gamma u(\hat{x}(t|k), \overline{\lambda}) \tag{32}$$

$$M(k+1|k) = FM(t|k)F' \tag{33}$$

$$D(k+1|k) = FD(t|k) + G \tag{34}$$

and the calculation of the state covariance S(k+1|k) according to $$S(k+1|k) = M(k+1|k) + D(k+1|k) \Lambda D(k+1|k)' \tag{35}$$

Thus, there are several differences between the invention herein as exemplified in FIG. 2 and the prior art. First, $\overline{\lambda}$ in the input function $u(\hat{x}(t|k), \overline{\lambda})$ in formula (32) refers to the mean value of the parameters $\lambda$, whose bounds are represented by the matrix $\Lambda$ in formula (35). Note that the input function $u(x(k), \lambda)$ may be a nonlinear function of the state variables x(k) and the multidimensional parameters $\lambda$. Another difference is that the prior art Kalman filter extrapolates the state covariance, while the current invention extrapolates the matrices M(t|k) and D(t|k) to M(k+1|k) and D(k+1|k), respectively, as in formulas (33) and (34), and then forms the total extrapolated covariance S(k+1|k) from M(k+1|k), D(k+1|k), and $\Lambda$ as in formula (35).

From block 224 of FIG. 2, the logic of the invention flows to a block 226, which represents the accessing or inputting of the measurement noise covariance N. Block 228 of FIG. 2 computes filter matrix Q, filter gain matrix K, and filter matrix L. While generically similar to the prior art, the filter gain matrix K obtained in block 228 of the arrangement of FIG. 2 are different from the filter gain matrix K obtained in prior art because of the use of M(k+1|k), D(k+1|k) and $\Lambda$ to construct S(k+1|k) in equation (35). The covariance of the residual Q is calculated in block 228 as $$Q = HS(k+1|k)H' + N \tag{36}$$

The filter gain matrix K is calculated as $$K = [M(t|k)F' + D(t|k) \Lambda D(k+1|k)']H'Q^{-1} \tag{37}$$

and the matrix L is calculated as $$L = I - KHF \tag{38}$$

where I is the identity matrix.

The logic flows from block 228 of FIG. 2 to a block 230, which represents the updating of the state estimate and the associated matrices. More particularly, the state estimate $\hat{x}(t|k+1)$ is calculated as $$\hat{x}(t|k+1) = \hat{x}(t|k) + K[z(k+1) - H\hat{x}(k+1|k)] \tag{39}$$

The matrices $M(t|k+1)$ and $D(t|k+1)$ are calculated as $$M(t|k+1)=LM(t|k)L'+KNK' \quad (40)$$

and $$D(t|k+1)=D(t|k)-KHD(k+1|k) \quad (41)$$

respectively. Finally, the matrix of the total covariance $S(t|k+1)$ is calculated as $$S(t|k+1)=M(t|k+1)+D(t|k+1)\Lambda D(t|k+1)' \quad (42)$$

and equation (42) represents a mean-square criterion which may be used for a root-mean-square determination. The logic of FIG. 2 returns from block 230 to block 212 by way of a path 231.

Figure 3:
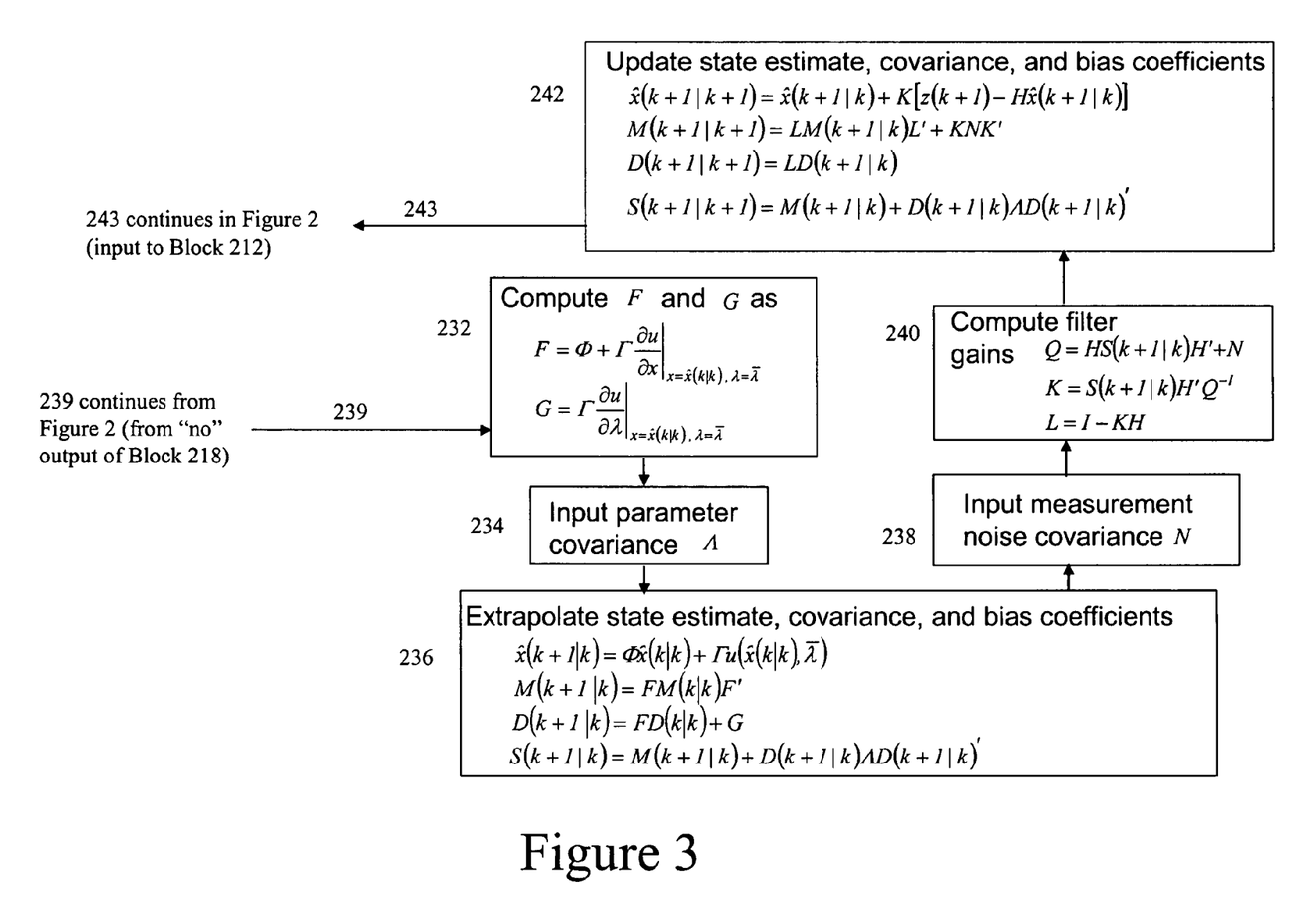

Returning now to decision block 218 of FIG. 2, the logic may leave block 218 by the NO output if $T \geq 0$, and in that case flows by way of a path 239 to block 232 of FIG. 3. Block 232 of FIG. 3 represents calculation of the matrices F and G according to $$F = \Phi + \Gamma \frac{\partial u}{\partial x}\bigg|_{x=\hat{x}(k|k), \lambda=\bar{\lambda}} \quad (43)$$

$$G = \Gamma \frac{\partial u}{\partial \lambda}\bigg|_{x=\hat{x}(k|k), \lambda=\bar{\lambda}} \quad (44)$$

From block 232 of FIG. 3, the logic of the invention of FIG. 3 flows to a block 234, which accesses or inputs a parameter matrix $\Lambda$. The parameter matrix $\Lambda$ represents the physical bounds on the unknown parameters, such as turn rate and tangential acceleration, and is preferably selected based on a description of the physical system, which should be as precise as possible or practicable. The parameter matrix $\Lambda$ depends upon well-known physical phenomena and characteristics of real systems. Types of physical parameters, which might be considered for determination of $\Lambda$ in the case of maneuvers, are the turn rate $\omega$ and the tangential acceleration $\alpha$. This is a departure from the prior art, which uses a white process noise covariance W that does not correctly model the class of systems addressed by the invention herein.

From block 234 of FIG. 3, the logic flow of the invention proceeds to a block 236, which represents the extrapolation of state estimates $\hat{x}(k|k)$, and matrices $M(k|k)$, $D(k|k)$, according to $$\hat{x}(k+1|k)=\Phi\hat{x}(k|k)+\Gamma u(\hat{x}(k|k),\bar{\lambda}) \quad (45)$$

$$M(k+1|k)=FM(k|k)F' \quad (46)$$

$$D(k+1|k)=FD(k|k)+G \quad (47)$$

and the calculation of the state covariance $S(k+1|k)$ according to $$S(k+1|k)=M(k+1|k)+D(k+1|k)\Lambda D(k+1|k)' \quad (48)$$

Thus, another difference between the invention herein and the prior art is that the prior art Kalman filter extrapolates state estimate $\hat{x}(k|k)$ and state covariance $S(k|k)$ to $\hat{x}(k+1|k)$ and $S(k+1|k)$, while the current invention extrapolates state estimate $\hat{x}(k|k)$ and matrices $M(k|k),D(k|k)$ to $\hat{x}(k+1|k)$ and $M(k+1|k),D(k+1|k)$ respectively.

From block 236 of FIG. 3, the logic of the invention flows to a block 238, which represents the accessing or inputting of the measurement noise covariance N. Block 240 of FIG. 2 computes filter matrix Q, filter gain matrix K, and filter matrix L. While generically similar to the prior art, the filter gain matrix K obtained in block 240 of the arrangement of FIG. 3 are different from the filter gain matrix K obtained in prior art because of the use of $M(k+1|k),D(k+1|k)$ and $\Lambda$ to formula $S(k+1|k)$ in equation (48). The covariance of the residual Q is calculated as $$Q=HS(k+1|k)H'+N \quad (49)$$

The filter gain matrix K is calculated as $$K=S(k+1|k)H'Q^{-1} \quad (50)$$

and the matrix L is calculated as $$L=I-KH \quad (51)$$

where I is the identity matrix.

The logic flows from block 240 of FIG. 3 to a block 242, which represents the updating of the state estimate and the associated matrices. More particularly, the state estimate $\hat{x}(k+1|k+1)$ is calculated as $$\hat{x}(k+1|k+1)=\hat{x}(k+1|k)+K[z(k+1)-H\hat{x}(k+1|k)] \quad (52)$$

The matrices $M(k+1|k)$ and $D(k+1|k)$ are calculated as $$M(k+1|k+1)=LM(k+1|k)L'+KNK' \quad (53)$$

and $$D(k+1|k+1)=LD(k+1|k) \quad (54)$$

respectively. Finally, the matrix of the total covariance $S(k+1|k+1)$ is calculated as $$S(k+1|k+1)=M(k+1|k+1)+D(k+1|k+1)\Lambda D(k+1|k+1)' \quad (55)$$

The logic leaves block 242 of FIG. 3 and returns to block 212 of FIG. 2 by way of a logic path 243. The above equations (29)–(55) are set forth in FIGS. 2 and 3, and in P. Mookerjee and F. Reifler, "Reduced State Estimator for Systems with Parametric Inputs," *IEEE Transactions on Aerospace and Electronic Systems*, pp. 446–461, Vol. AES-40, No. 2, Apr. 2004.

The calculations associated with block 236 of FIG. 3 separate the state estimation error covariance $S(j|k)$ into components, $M(j|k)$ and $D(j|k)\Lambda D(j|k)'$, attributable to measurement error and parameter uncertainty, and separately propagates these covariances from one time index k to next time index k+1. In addition, the gain matrix K is computed based on these propagated covariances. The gains weight the measurements to form the state estimates. The values of these gains so computed are, of course, different from those computed by the prior art method.

A salient difference between the prior-art method and that of the invention is the introduction into the equations defining a multidimensional state estimation error covariance denoted above as $M(j|k)$, attributable to measurement error and $D(j|k)\Lambda D(j|k)'$, representing the physical bounds of the parameters, and propagating certain coefficients (denoted as $D(k|k)$ and $D(k+1|k)$). The matrix $M(j|k)$ is defined as the covariance of the state estimation errors at time $t_j$ due only to the errors in the measurements $z(i)$ for $1 \leq i \leq k$ and a priori initial information that is independent of the parameter uncertainty. $D(j|k)$ is defined as the matrix of bias coefficients, which linearly relates state estimation errors to the parameter errors, at time $t_j$ (after processing k=0,1,2, . . . measurements). The article by Portmann, Moore, and Bath 1990 mentions, "The optimum approach is to reorder the measurements in time and reprocess them in time order. If the measurements are badly scrambled, however, this can significantly increase the computational burden of the filter and may not be an option open to the filter designer. The SCF filter can be modified to produce a suboptimal estimate for a measurement out of time sequence which requires little more computation than for a measurement in time sequence. The criteria for optimality is somewhat different from that described in the preceding sections, but the form of the filter is very nearly the same." No algorithm is provided in their article supporting the abovementioned statements.

Thus, the invention uses a novel mean-square optimization criterion (equation (42) or (48)) which explicitly addresses the known physical bounds of the multidimensional parameters, and incorporates analytical modeling of the parameter bounds, whose modeling may be as precise as knowledge of the boundary values permits. The invention provides an exact implementable recursive solution that optimizes the mean-square criterion.

What is claimed is:

1. A method for recursively estimating the state of a system having multidimensional parameters $\lambda$ in addition to state variables x(k) at time $t_k$ for k=1,2,3, . . . , which parameters $\lambda$ are unknown, arbitrarily time-varying, but bounded, and driven by the input function $u(x(k),\lambda)$ and governed by the state equation $$x(k+1)=\Phi x(k)+\Gamma u(x(k),\lambda)$$

where $\Phi,\Gamma$ are system matrices dependent on the discrete time interval $T=t_{k+1}-t_k$: said method comprising the following steps:
  measuring aspects of the state of the system to produce initial measurements;
  initializing state estimates $\hat{x}(k_0|k_0)$ and the matrices $M(k_0|k_0)$, $D(k_0|k_0)$ using a priori information and the initial measurements,
  where
    vector $\hat{x}(t|k)$ is defined as the estimate of the state of the system at time t after processing the measurements z(i) for $1 \leq i \leq k$;
    vector $\hat{x}(t_j|k)$ is denoted as $\hat{x}(j|k)$ when the time $t=t_j$ is the time of the $j^{th}$ measurement for j=1,2,3, . . . ;
    matrix M(t|k) is defined as the covariance of the state estimation errors at time t due only to the errors in the measurements z(i) for $1 \leq i \leq k$ and a priori initial information that is independent of the parameter uncertainty;
    matrix $M(t_j|k)$ is denoted as M(j|k), when the time $t=t_j$ is the time of the $j^{th}$ measurement for j=1,2,3, . . . ;
    matrix D(t|k) is defined as the matrix of bias coefficients, which linearly relates state estimation errors to the parameter errors, at time t (after processing k=0,1,2, . . . measurements);
    matrix $D(t_j|k)$ is denoted as D(j|k), when the time $t=t_j$ is the time of the $j^{th}$ measurement for j=1,2,3, . . . ;
  determining the time $t_{k+1}$ of a new measurement and the time t when the filter was last updated;
  using the update interval $T=t_{k+1}-t$, determine the system transition matrices $\Phi$ and $\Gamma$;
  determining the mean value $\bar{\lambda}$ of unknown but bounded parameters $\lambda$, and the input vector $u(\hat{x}(t|k),\bar{\lambda})$;
  measuring aspects of the state of the system governed by the measurement equation $$z(k)=Hx(k)+n(k)$$

where n(k) is the measurement noise with covariance N and measurement matrix H at time $t_k$ for k=1,2,3, . . . ;
  determining if the measurement is time-late by testing T<0;
  (a) if the measurement is time-late determining F,G as follows $$F = \Phi + \Gamma \frac{\partial u}{\partial x}\bigg|_{x=\hat{x}(t|k),\lambda=\bar{\lambda}}$$

$$G = \Gamma \frac{\partial u}{\partial \lambda}\bigg|_{x=\hat{x}(t|k),\lambda=\bar{\lambda}}$$

generating a parameter matrix $\Lambda$, representing physical bounds on the parameters $\lambda$ that are not state variables of the system;
  extrapolating said state estimates $\hat{x}(t|k)$ and matrices M(t|k), D(t|k), to $\hat{x}(k+1|k)$, M(k+1|k), D(k+1|k), and calculating S(k+1|k) as in $$\hat{x}(k+1|k)=\Phi\hat{x}(t|k)+\Gamma u(\hat{x}(t|k),\bar{\lambda})$$

$$M(k+1|k)=FM(t|k)F'$$

$$D(k+1|k)=FD(t|k)+G$$

$$S(k+1|k)=M(k+1|k)+D(k+1|k)\Lambda D(k+1|k)'$$

determining covariance of the residual Q as in $$Q=HS(k+1|k)H'+N$$

determining the filter gain matrix K as in $$K=[M(t|k)F'+D(t|k)\Lambda D(k+1|k)']H'Q^{-1}$$

determining the matrix L as in $$L=I-KHF$$

where I is the identity matrix;
  updating the state estimate $\hat{x}(t|k)$ as $$\hat{x}(t|k+1)=\hat{x}(t|k)+K[z(k+1)-H\hat{x}(k+1|k)]$$

updating the matrices M(t|k) and D(t|k) as $$M(t|k+1)=LM(t|k)L'+KNK'$$

$$D(t|k+1)=D(t|k)-KHD(k+1|k)$$

respectively, and generating the total mean square error S(t|k+1) as in $$S(t|k+1)=M(t|k+1)+D(t|k+1)\Lambda D(t|k+1)'$$

(b) and if the measurement is not time-late determining F,G using $$F = \Phi + \Gamma \frac{\partial u}{\partial x}\bigg|_{x=\hat{x}(k|k),\lambda=\bar{\lambda}}$$

and, $$G = \Gamma \frac{\partial u}{\partial \lambda}\bigg|_{x=\hat{x}(k|k),\lambda=\bar{\lambda}}$$

generating a parameter matrix Λ, representing physical bounds on those parameters that are not state variables of the system;

extrapolating said state estimates x̂(k|k) and matrices M(k|k), D(k|k), S(k|k) to x̂(k+1|k), M(k+1|k), D(k+1|k), and S(k+1|k) as in $$\hat{x}(k+1|k) = \Phi\hat{x}(k|k) + \Gamma u(\hat{x}(k|k), \bar{\lambda})$$

$$M(k+1|k) = FM(k|k)F'$$

$$D(k+1|k) = FD(k|k) + G$$

$$S(k+1|k) = M(k+1|k) + D(k+1|k)\Lambda D(k+1|k)'$$

determining covariance of the residual Q as in $$Q = HS(k+1|k)H' + N$$

determining the filter gain matrix K as in $$K = S(k+1|k)H'Q^{-1}$$

determining the matrix L as in $$L = I - KH$$

where I is the identity matrix;
updating the state estimate x̂(k+1|k) as $$\hat{x}(k+1|k+1) = \hat{x}(k+1|k) + K[z(k+1) - H\hat{x}(k+1|k)]$$

updating the matrices M(k+1|k) and D(k+1|k) as $$M(k+1|k+1) = LM(k+1|k)L' + KNK'$$

and, $$D(k+1|k+1) = LD(k+1|k)$$

respectively, and generating the total mean square error S(k+1|k+1) as $$S(k+1|k+1) = M(k+1|k+1) + D(k+1|k+1)\Lambda D(k+1|k+1)'$$

after

2. A method for estimating the state of a system comprising the steps of:

observing a system having state variables and also having unknown, multidimensional, arbitrarily time-varying parameters, but which are subject to known bounded values and driven by a time-varying input function that depends on the states, and multidimensional parameters;

measuring certain aspects of the state of the system in the presence of measurement errors to produce initial measurements;

initializing state estimates and matrices using a priori information and the initial measurements;

using the update interval in determining the system transition matrices and the mean value of unknown but bounded parameters and the input vector;

determining if the measurement is time-late by testing the sign of the update interval;

if the measurement is time-late applying the measurements to an out-of-sequence estimating filter that explicitly uses a mean square optimization criterion that separately accounts for measurement errors and said bounding values, as well as the delay time, to produce estimates of the true state of the system;

if the measurement is not time-late applying the measurements to an in-sequence estimating filter that explicitly uses a mean square optimization criterion that separately accounts for measurement errors and said bounding values, to produce estimates of the true state of the system;

applying said estimates to one of (a) make a decision relating to said system, (b) operate a control system, and (c) control a process.

* * * * *